(12) United States Patent
Cool et al.

(10) Patent No.: US 7,656,409 B2
(45) Date of Patent: Feb. 2, 2010

(54) GRAPHICS PROCESSING ON A PROCESSOR CORE

(75) Inventors: Lyle Cool, Beaverton, OR (US); Yasser Rasheed, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 382 days.

(21) Appl. No.: 11/317,829

(22) Filed: Dec. 23, 2005

(65) Prior Publication Data

US 2007/0146373 A1    Jun. 28, 2007

(51) Int. Cl.
*G06F 15/00* (2006.01)
*G06T 1/00* (2006.01)

(52) U.S. Cl. .................... 345/501; 345/522; 712/220; 712/225

(58) Field of Classification Search ............... 345/502, 345/501, 522; 712/220, 225
See application file for complete search history.

(56) References Cited

U.S. PATENT DOCUMENTS

| | | | | |
|---|---|---|---|---|
| 5,968,167 | A * | 10/1999 | Whittaker et al. | 712/225 |
| 6,553,223 | B1 * | 4/2003 | Bayley et al. | 455/419 |
| 7,075,541 | B2 * | 7/2006 | Diard | 345/505 |
| 7,437,703 | B2 * | 10/2008 | Wu | 717/100 |
| 2004/0160446 | A1 * | 8/2004 | Gosalia et al. | 345/503 |

* cited by examiner

*Primary Examiner*—M Good Johnson
(74) *Attorney, Agent, or Firm*—Blakely, Sokoloff, Taylor & Zafman LLP

(57) ABSTRACT

In a many core system, receiving a call to a graphics driver; translating the call into a command executable on a core of the many core system; and executing the translated call on the core.

16 Claims, 3 Drawing Sheets

GRAPHICS PROCESSING ON A PROCESSOR CORE

BACKGROUND

Processor-based systems, such as personal computers, servers, laptop computers, personal digital assistants (PDAs) and other processor-based devices, such as "smart" phones, game consoles, set-top boxes and others, may be multiprocessor or multi-core systems. For example, an Intel® architecture processor in such a system may have two, four or some other number of cores. Such multiprocessor or multi-core systems are generally referred to as many core systems in the following.

Many processor-based systems incorporate a specific or special-purpose graphics device such as a graphics processing unit in order to reduce the processing load on the central processing unit or processor for graphics related computation. Typically a component of the operating system, such as, for example, a Microsoft Windows operating system, provides an interface to such a graphics device or GPU termed a graphics driver. Often, a standard application programming interface (API) is provided by various different kinds of graphics drivers. Of the possible functionality provided by the API, not all may be implemented on a specific platform. This may depend in part on the capabilities of the GPU installed on the platform. For example, a GPU provider may provide a single driver for various GPUs that are manufactured by the provider. However the graphics driver may or may not provide a specific functionality depending on whether the underlying GPU supports that functionality. Typically, integrated graphics hardware is often provided on platforms where cost saving is a predominant design consideration, and thus the performance and capabilities of integrated graphics hardware is not at the same level as dedicated graphics GPUs that are provided on for more expensive platforms. Therefore, especially in a situation where a platform provides only integrated graphics hardware, it may be desirable to augment the performance and/or capabilities of the graphics on the platform where possible.

Generally the graphics driver or device driver for the GPU advertises in some standardized way the specific types of hardware acceleration available on the GPU. When the graphics driver receives a call to perform a particular operation, the driver translates that call into a specific command or commands that are then executed by the GPU. Other functionality provided by the graphics driver may include configuring or setting up the GPU to be compatible with graphics hardware such as a monitor or a display device. Other layers of the software stack may be involved in accessing and programming the GPU. For example, the operating system (OS) may regulate and mediate access to the hardware as well. Finally, an application itself may query the hardware for its capabilities through either the operating system or through the graphics driver depending on the specific implementation.

DETAILED DESCRIPTION

Figure 1:
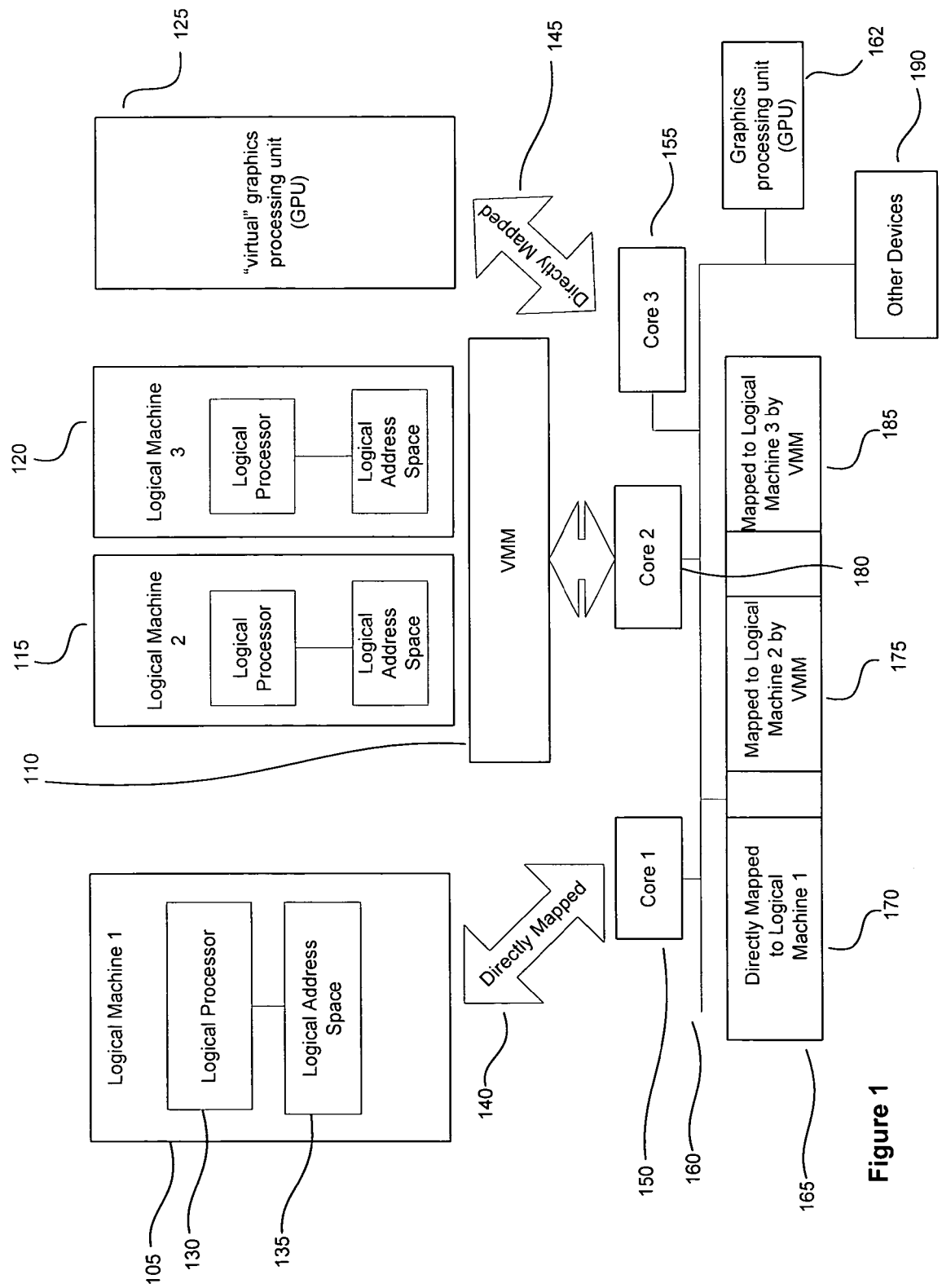
FIG. 1 depicts a many core system in one embodiment.

A many core system is a term used herein to refer to a system such as that depicted in FIG. 1. As in the figure, a many core system may include a plurality of processor cores or processors such as cores 150, 155 and 180. The term core as used herein may refer, for example, to a single processor of a multiprocessor system, or to a processor core of a multicore processor. In general, the system has a set of busses such as the bus 160 that interconnects the cores and a memory 165 with devices on the bus such as a graphics processing unit (GPU) 162, or other devices 190. These devices may include for example, storage, input and output devices. As shown in the system depicted, the cores may form the basis of several logical machines presenting an abstraction of processor and memory, such as logical machines 1-3, at 105, 115, and 120. Each logical machine provides a logical view of a processor 130 and memory 135 to programs executing on the logical machine. In some instances such as with logical machine 1 at 105, a core such as the core 150 and a segment of the system memory 170 may be directly mapped 140 to the logical machine 105 much as in a single processor system. In other instances, logical machines may actually be virtual machines such as the machines 115 and 120, that may in turn execute via a virtual machine monitor (VMM) that itself executes directly on a core such as the core at 180. The VMM may then partition the memory available to its core 180 into segments 175 and 185 allocated to the virtual logical machines 115 and 120 respectively. General purpose logical machines of a many core system such as 105, 115 and 120 may also be referred to as (logical) address spaces of the system, because each logical machine defines an address space within which a logical memory and a register set of a processor may be referenced. Special purpose logical machines may also be provided, for example a "virtual" graphics processing unit may be provided as a logical GPU by directly mapping 145 a core such as core 3, 155. Similarly, other devices including I/O devices, may be provided as logical devices.

Figure 2:
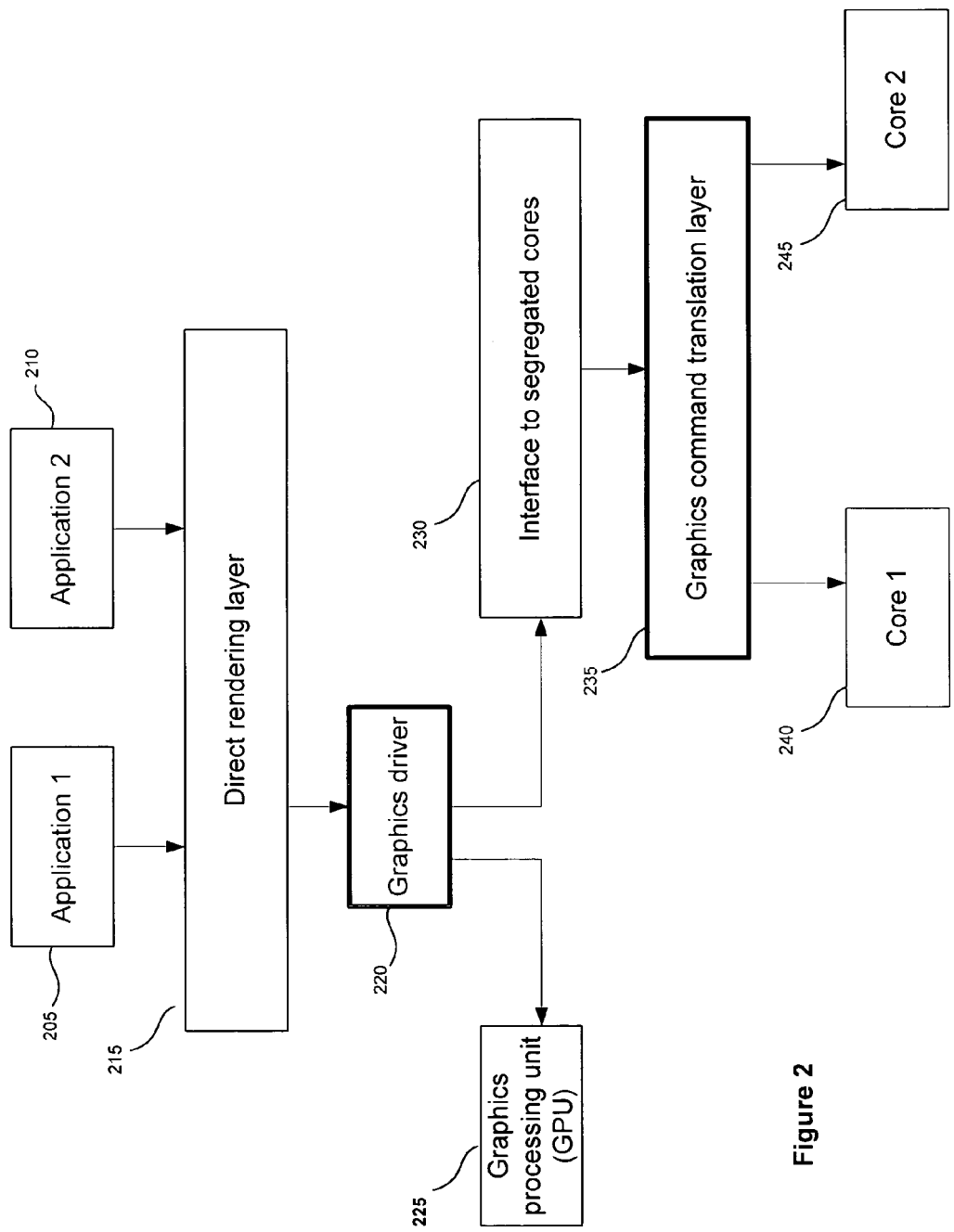
FIG. 2 depicts a logical block diagram of one embodiment.

In one embodiment, one or more cores of a many core platform may be isolated from the operating system for the purposes of providing additional hardware capability for graphics processing. In FIG. 2 one or more cores in a multi-core system or processors in a multi-processor system such as core 1 at 240 and core 2 at 245 comprise part of a platform that are not accessible to the operating system in general. Instead, they are managed by an interface to segregated cores 230, which may be a firmware layer. The many core platform also comprises a dedicated graphics processing hardware or GPU, 225. In some embodiments, as depicted in FIG. 2, the graphics processing unit may be a separate chip or chipset interconnected to the processor and memory on the main board by a bus or buses. In other embodiments the graphics processing unit may simply be a hardware subcomponent of another device on the main board, for example it may be integrated into either a processor itself, or it may be a part of some other device, for example of a chipset found in many processor-based systems, that is, it may be integrated graphics hardware as previously referenced. In this embodiment, a graphics command translation layer 235 is provided at a low level to translate graphics commands transmitted by the firmware layer 230 into code that can be executed on the cores 240 and 245. A graphics driver 220, provides a standard interface to applications such as 205 and 210. That is, the graphics driver provides standardized primitives or an API that the applications may access to create graphics or render video, among other applications, on a display device. The applications 205 and 210, may in some embodiments use a direct rendering layer 215, such as a Microsoft® DirectX® or alternatively an OpenGL layer interface. In other embodiments, the direct rendering layer 215 may not be present and applications may interact with the graphics driver directly. In this embodiment the graphics driver is modified from a standard graphics driver in that it is aware of the underlying availability of separate segregated cores 240 and 245 and the translation layer 235. In this embodiment therefore, the graphics driver then is capable of making a determination whether to implement a specific API by making a call to the graphics processing unit 225, or by using the segregated cores 240 and 245 using the interface to the segregated cores at 230.

As should be evident to the artisan, a practically unlimited set of variations of the many core system depicted in the figure is possible. In particular, the number of cores, and the mapping from cores to logical machines may be varied; in some embodiment systems, there may be no virtual machines present, while in others all the logical machines may be virtual. As indicated previously, the graphics hardware of the platform may be a separate GPU made up of one or more hardware devices, or alternatively the graphics hardware may be an integrated graphics solution forming part of some other hardware device on the main board. In some embodiments, only one core may be segregated. In others multiple cores may be available for graphics processing as described above. Similar embodiments are possible in multi-processor systems where, instead of multiple cores, multiple separate processors may be present. Embodiments may be implemented in hybrid systems in which multiple processors, some of which may themselves be multi-core processors, are present. Many other variations are possible.

Figure 3:
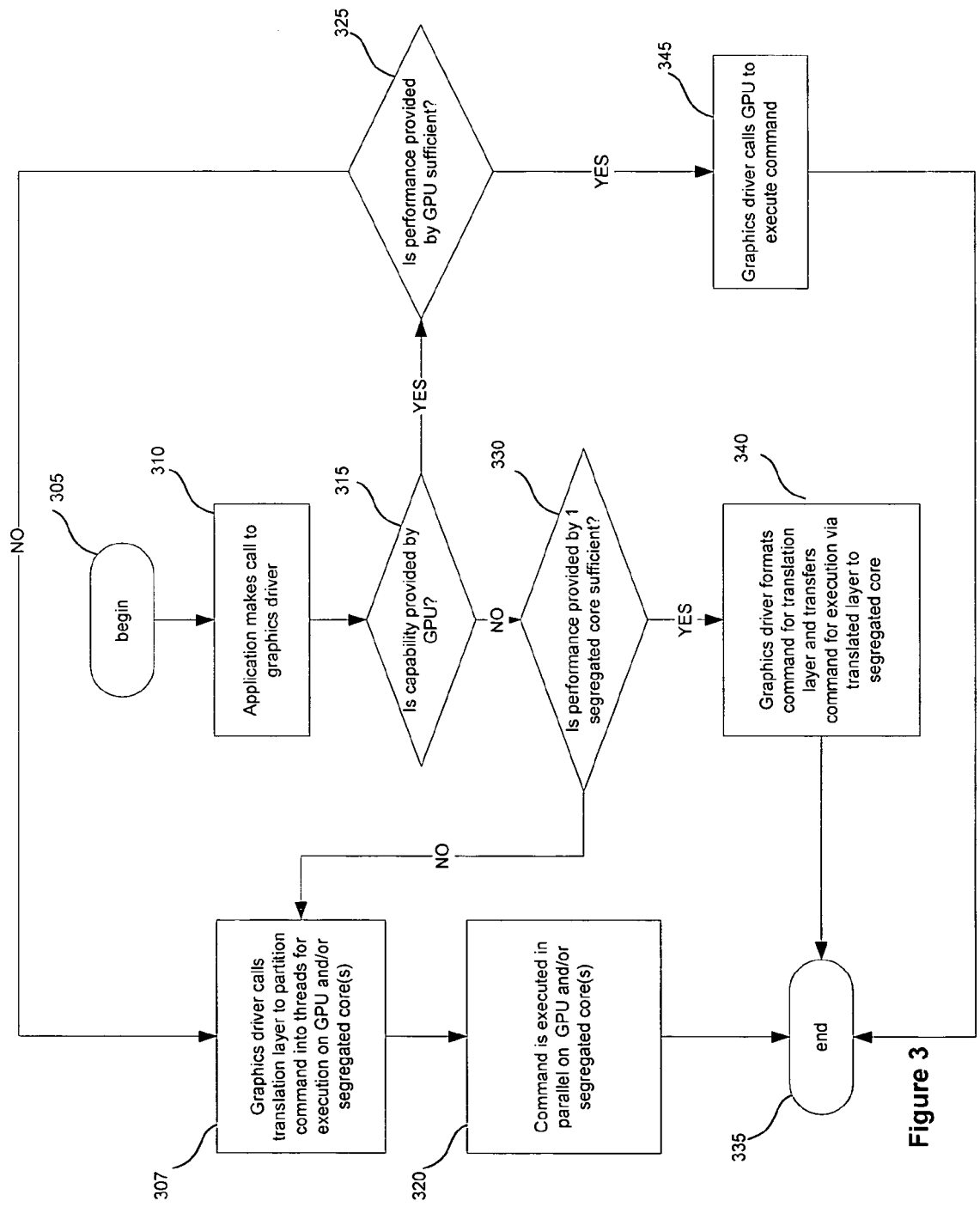
FIG. 3 depicts the flow of processing at high level in one embodiment.

FIG. 3 depicts processing in one embodiment such as that depicted earlier in FIG. 2. Processing begins, 305, when an application makes a call that needs to be handled by a graphics driver at 310. In some embodiments, the graphics driver may be itself called by an intervening layer such as a DirectX or OpenGL layer. The graphics driver is enhanced as indicated above with reference to FIG. 2. This means that the driver is capable of making a determination at 315 and deciding whether the capability requested is provided by platform graphics hardware. If such a capability is not provided, the graphics driver may then be able to use the functionality described above with reference to FIG. 2 to provide this capability using a segregated core. Optionally as at 330 the graphics driver may check whether the performance provided by the segregated core is sufficient. If performance is not a concern, the graphics driver formats the command that corresponds to the call made by the application and invokes the translation layer via an interface to the segregated core or cores, at 340. The translation layer at 340 then converts the graphics command into appropriate code executable on the segregated core, and manages that execution, at 340.

However, if the graphics driver determines at 330 that performance provided by one segregated core is insufficient, it may in some embodiments partition the execution of the command into multiple threads which may then be divided up among available multiple segregated cores. In this embodiment, the synchronization and management of thread and data partition, and the management of conflicts among these threads may be the responsibility of the translation layer. In other embodiments such coordination functions may be handled by the platform interface to the segregated cores.

In an alternative path of processing, if the graphics driver determines at 315 that the capability requested is indeed provided by the graphics hardware, it may still consider using one or more of the segregated cores. This may occur, if, as at 330, the graphics driver determines that the performance provided by the GPU alone would probably be insufficient; or if the driver determines that the GPU is already busy because of some previously defined task. In this case, as before, control is transferred to 307, where the graphics driver may then call the translation layer to partition the command into multiple threads. The threads may now execute on the GPU itself, as well as on the one or more segregated cores at 320. As before, the partitioning of the command into threads, and the management of any associated data partitioning and data conflicts may be done by the translation layer, or by the firmware layer that is responsible for the interface to the segregated cores. In all cases the command is executed either in parallel, or sequentially on the GPU, or on one or more segregated cores, or both, and processing terminates with the completion of the command at 335.

Many variations on the above described processing are possible. As is well known to those in the art, the control flow depicted in FIG. 3 may be varied over a wide range without altering the input output behavior of the functionality described. Furthermore the processing in FIG. 3 is generic and covers a large variety of underlying platform embodiments. As previously discussed a particular platform may include either an integrated graphics solution or a GPU or in some instances both. Furthermore a particular platform may be a multicore platform or a combination of a multicore and a multiprocessor platform. Some of the functional cores on the platform dedicated for use by the operating system may themselves be virtual machines or be logically partitioned into multiple virtual machines. In some embodiments only one segregated core may be present and thus the parallelism described with reference to block 305 of FIG. 3 may be limited to the GPU and one core. In other embodiments no parallelism between the GPU and any of the cores may be possible. While the above described embodiment describes the cores as segregated, in that they are hidden from the view of the operating system, other embodiments are possible in which the operating system itself allocates a core for graphics processing in a manner consistent with the description above. Finally in some platforms, cores may be dynamically segregable in that a segregated core may be rotated into service as part of the operating system's set of cores and then rotated out of service as needed. This may occur for example as a configuration change managed at boot time. Many other variations are possible.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions.

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. In a many core system, a method comprising:
   receiving a call to a graphics driver in a many core system, the graphics driver managing execution of the call on an execution platform that includes a dedicated graphics processing unit ("GPU") interconnected to the many core system and one or more cores in the many core system, the graphics driver:
      executing the call on the dedicated GPU after determining that the dedicated GPU is available and able to execute the call and that an estimated performance of the call on the available and able dedicated GPU alone is sufficient;
      executing the call on a single core of the many core system after determining that the dedicated GPU is unavailable or unable or that the estimated performance of the call on the available and able dedicated GPU is insufficient, and that the single core is available to execute the call and that an estimated performance of the call on the available single core alone is sufficient;
      executing the call in parallel on one or both of the available and able dedicated GPU and one or more available cores of the many core system after determining that the estimated performance of the execution of the call on either the available single core alone or the available and able dedicated GPU alone is insufficient; and
   translating the call into a command executable on an available core of the many core system when executing the call on the available core.

2. The method of claim 1 wherein translating the call into a command executable on the core of the many core system farther comprises a translation layer of the system performing the translation of the call into a command executable on the core of the many core system.

3. The method of claim 2 further comprising
   the translation layer partitioning the execution of the command into a plurality of threads; and
   the translation layer scheduling the execution of the plurality of threads on at least the graphics processing unit, and the core.

4. The method of claim 2 wherein the many core system further comprises a plurality of cores, further comprising the translation layer partitioning the execution of the command into a plurality of threads and the translation layer scheduling the execution of the plurality of threads on at least the graphics processing unit and one or more of the plurality of cores.

5. The method of claim 1 wherein the core further comprises a segregated core of the many core system configured to be inaccessible to the operating system.

6. The method of claim 5 wherein a firmware layer provides an interface to the segregated core; and wherein executing the translated call on the core further comprises using a service of the firmware layer to execute the translated call on the segregated core.

7. A machine-readable medium having stored thereon data that when accessed via machine causes the machine to perform a method comprising:
   receiving a call to a graphics driver in a many core system, the graphics driver managing execution of the call on an execution platform that includes a dedicated graphics processing unit ("GPU") interconnected to the many core system and one or more cores in the many core system, the graphics driver:
      executing the call on the dedicated GPU after determining that the dedicated GPU is available and able to execute the call and that an estimated performance of the call on the available and able dedicated GPU alone is sufficient;
      executing the call on a single core of the many core system after determining that the dedicated GPU is unavailable or unable or that the estimated performance of the call on the available and able dedicated GPU is insufficient, and that the single core is available to execute the call and that an estimated performance of the call on the available single core alone is sufficient;
      executing the call in parallel on one or both of the available and able dedicated GPU and one or more available cores of the many core system after determining that the estimated performance of the execution of the call on either the available single core alone or the available and able dedicated GPU alone is insufficient; and translating the call into a command executable on an available core of the many core system when executing the call on the available core.

8. The machine-readable medium of claim 7 wherein translating the call into a command executable on the core of the many core system further comprises a translation layer of the system performing the translation of the call into a command executable on the core of the many core system.

9. The machine-readable medium of claim 8 farther comprising the translation layer partitioning the execution of the command into a plurality of threads; and the translation layer scheduling the execution of the plurality of threads on at least the graphics processing unit, and the core.

10. The machine-readable medium of claim 8 where in the many core system further comprises a plurality of cores, further comprising the translation layer partitioning the execution of the command into a plurality of threads and the translation layer scheduling the execution of the plurality of threads on at least the graphics processing unit and one or more of the plurality of cores.

11. The machine-readable medium of claim 7 wherein the core farther comprises a segregated core of the many core system configured to be inaccessible to the operating system.

12. The machine-readable medium of claim 11 wherein a firmware layer provides an interface to the segregated core; and wherein executing the translated call on the core further comprises using a service of the firmware layer to execute the translated call on the segregated core.

13. A many core system comprising:

a plurality of cores in the many core system;

a memory including a graphics driver module; and a store;

wherein the graphics driver module is adapted to receive a call to a graphics driver, the graphics driver further adapted to manage execution of the call on an execution platform that includes a dedicated graphics process unit ("GPU") interconnected to the many core system, including being adapted to:

execute the call on the dedicated GPU after determining that the dedicated GPU is available and able to execute determine whether the call and that an estimated performance of the call on is executable either on the core or on the available and able dedicated graphics processing unit GPU alone is sufficient;

execute the call on a single core of the many core system after determining that the dedicated GPU is unavailable or unable or that the estimated performance of the call on the available and able dedicated GPU is insufficient, and that the single core is available to execute the call and that an estimated performance of the call on the available single core alone is sufficient;

execute the call in parallel on one or both of the available and able dedicated GPU and one or more available cores of the many core system after determining that the estimated performance of the execution of the call on either the available single core alone or the available and able dedicated GPU alone is insufficient; and wherein the graphics driver module is further adapted to translate the call into a command executable on an available core of the plurality of cores; and to execute the translated call on the available core of the plurality of cores.

14. The system of claim 13 wherein the one of the plurality of cores further comprises a segregated core of the many core system configured to be inaccessible to the operating system.

15. The system of claim 14 further comprising a firmware layer to provide an interface to the segregated core; and to provide a service to execute the translated call on the segregated core.

16. The system of claim 13 wherein the memory further comprises dynamic random access memory (DRAM).

* * * * *